United States Patent
Dudra et al.

(10) Patent No.: US 7,318,386 B2
(45) Date of Patent: Jan. 15, 2008

(54) POWER ASSIST STEERING APPARATUS AND METHOD RESPONSIVE TO VOLUME FLOW OF FLUID

(75) Inventors: Brian James Dudra, Vancouver (CA); Tat Lung Ray Wong, Richmond (CA); Neal Wesley Denis Wood, Coquitlam (CA)

(73) Assignee: Teleflex Canada Incorporated, Richmond (CA)

( * ) Notice: Subject to any disclaimer, the term of this patent is extended or adjusted under 35 U.S.C. 154(b) by 0 days.

(21) Appl. No.: 10/507,833

(22) PCT Filed: Jun. 15, 2004

(86) PCT No.: PCT/CA2004/000874

§ 371 (c)(1),
(2), (4) Date: Jun. 8, 2006

(87) PCT Pub. No.: WO2005/123486

PCT Pub. Date: Dec. 29, 2005

(65) Prior Publication Data
US 2006/0272881 A1  Dec. 7, 2006

(51) Int. Cl.
*B63H 25/22* (2006.01)
(52) U.S. Cl. ............... 114/150; 180/417; 440/61 S
(58) Field of Classification Search ........ 114/150; 440/61 A, 61 C, 61 R, 61 S; 180/417, 419; 60/422, 423, 431, 435
See application file for complete search history.

(56) References Cited

U.S. PATENT DOCUMENTS

| | | | | |
|---|---|---|---|---|
| 2,601,405 A * | 6/1952 | Link | ................ | 114/150 |
| 3,400,537 A | 9/1968 | Mercier | | |
| 3,878,763 A * | 4/1975 | Lang | ................ | 60/468 |
| 3,971,214 A * | 7/1976 | Mercier | ................ | 60/386 |
| 6,487,824 B1 | 12/2002 | West et al. | | |
| 6,820,567 B1 | 11/2004 | Kishi et al. | | |

FOREIGN PATENT DOCUMENTS

WO    WO 0119670 A1 *    3/2001

OTHER PUBLICATIONS

PCT/JP00/04573 International Search Report.

* cited by examiner

*Primary Examiner*—Lars A. Olson
(74) *Attorney, Agent, or Firm*—Baker & Hostetler LLP

(57) ABSTRACT

An apparatus and method for providing power assisted steering for a marine craft having a manually operable steering pump and a hydraulic steering actuator. A powered hydraulic pump is hydraulically connected between the manually operable pump and the actuator. Hydraulic fluid volume output of the steering pump and hydraulic fluid volume output of the powered pump are sensed. The fluid output of the steering pump is compared with the fluid output of the powered pump and the powered pump is operated so that the output of the powered pump is commensurate with output of the steering pump.

30 Claims, 4 Drawing Sheets ble hydraulic steering pump, a hydraulic steering actuator and hydraulic conduits hydraulically connecting the manually operable pump to the actuator. Manual operation of the manually operable pump moves the actuator. A powered hydraulic pump is hydraulically connected by the conduits between the manually operable pump and the actuator. There is means for operating the powered hydraulic pump when the manually operable pump is operated to assist movement of the hydraulic steering actuator. The means is actuated by sensing a volume of fluid displaced by the manually operable pump.

POWER ASSIST STEERING APPARATUS AND METHOD RESPONSIVE TO VOLUME FLOW OF FLUID

BACKGROUND OF THE INVENTION

This invention relates to powered hydraulic steering systems and, in particular, to power assist hydraulic steering systems typically used for marine craft.

Published International Patent Application PCT/JP 00/04573 to Marol discloses a power steering system including a closed hydraulic circuit with a helm pump and a double acting hydraulic cylinder connected to the rudder. The powered hydraulic pump is activated by sensing pressure output from the helm pump.

One problem with such a power steering system is that the pump is only activated after a predetermined amount of pressure builds up from the operation of the helm pump. This causes a lack of sensitivity when the operator steers the vessel via the helm.

SUMMARY OF THE INVENTION

According to one aspect of the invention, there is provided a hydraulic steering apparatus. The apparatus includes a manually opera According to another aspect of the invention, there is provided a power assist steering apparatus, comprising a powered hydraulic pump, a first port for receiving hydraulic fluid from a manually operable steering pump and means for detecting a flow of fluid into the apparatus through the first port. There is a controller for operating the powered hydraulic pump when said flow of fluid into the apparatus through the first port is detected. A second port outputs fluid to a hydraulic steering actuator. There is means for directing hydraulic fluid output from the powered hydraulic pump to the second port, and for directing fluid flowing into the apparatus to the powered hydraulic pump, when said flow of fluid into the apparatus through the first port is detected.

According to a further aspect of the invention, there is provided a marine craft having a power assist steering system. The craft includes a hull having a bow and a stern. A manually operable, hydraulic steering pump is mounted in the hull and has a first steering pump port and a second steering pump port. A steering actuator is adjacent to the stern and has a first steering actuator port and a second steering actuator port. A powered hydraulic pump is mounted in the hull and has a motor, an input port and an output port. There is a directional control valve having a movable valve spool, a first valve port hydraulically connected to the first steering pump port, a second valve port hydraulically connected to the second steering pump port, a third valve port hydraulically connected to the first steering actuator port, a fourth valve port hydraulically connected to the second steering actuator port, a fifth valve port hydraulically connected to the input port of the powered hydraulic pump and a sixth valve port hydraulically connected to the output port of the powered hydraulic pump. The valve is hydraulically actuated, whereby hydraulic fluid flowing into the first valve port displaces the valve spool to connect the first valve port to the fifth valve port, to connect the sixth valve port to the third valve port and to connect the fourth valve port to the second valve port. Hydraulic fluid flowing into the second valve port displaces the valve spool to connect the second valve port to the fifth valve port, to connect the sixth valve port to the fourth valve port and to connect the first valve port to the third valve port. A position sensor is adjacent to the directional control valve for detecting a position of the spool thereof. A motor controller is operatively connected to the position sensor and to the motor for operating the motor, and thereby the powered hydraulic pump, when the spool of the direction control valve is displaced by hydraulic fluid flowing into the first valve port or the second valve port.

According to a further aspect of the invention, there is provided a method for providing power assist steering for a marine craft having a manually operable steering pump and a hydraulic steering actuator. The method comprises hydraulically connecting a powered hydraulic pump between the manually operable pump and the actuator, connecting to the manually operable pump and the powered hydraulic pump a control valve with a movable member, and placing adjacent to the control valve a sensor for sensing a position of the movable member. The member is displaced by hydraulic fluid entering the control valve, the sensor sensing said displacement of the member and operating the powered hydraulic pump to assist in pumping hydraulic fluid from the manually operable pump to the actuator.

According to a still further aspect of the invention, there is provided a hydraulic power assist steering system. There is a manually operable, hydraulic steering pump having a first steering pump port and a second steering pump port. A steering actuator has a first steering actuator port and a second steering actuator port. A powered hydraulic pump has an electric motor, an input port and an output port. There is a directional control valve having a movable valve spool, a first valve port hydraulically connected to the first steering pump port, a second valve port hydraulically connected to the second steering pump port, a third valve port hydraulically connected to the first steering actuator port, a fourth valve port hydraulically connected to the second steering actuator port, a fifth valve port hydraulically connected to the input port of the powered hydraulic pump and a sixth valve port hydraulically connected to the output port of the powered hydraulic pump. The valve is hydraulically actuated, whereby hydraulic fluid flowing into the first valve port displaces the valve spool to connect to the first steering pump port to the input port of the powered hydraulic pump, to connect the output port of the powered hydraulic pump to the first steering actuator port and to connect the second steering actuator port to the second the valve port. Hydraulic fluid flowing into the second steering pump port displaces the valve spool to connect the second steering pump port to the input port of the powered hydraulic pump, connects the output port of the powered hydraulic pump to the second steering actuator port and connects the first steering actuator port to the first steering pump port. A position sensor adjacent to the directional control valve detects a position of the spool thereof. A motor controller is operatively connected to the position sensor and to the motor for operating the motor, and thereby the powered hydraulic pump, when the spool of the direction control valve is displaced by hydraulic fluid flowing into the first valve port or the second valve port.

The invention offers significant advantages compared to earlier hydraulic power steering systems where the powered pump is actuated by sensing the pressure of hydraulic fluid discharged from the steering pump. By comparison, the invention activates the motor by sensing a volume flow of fluid from the steering pump without requiring any minimum pressure for pump operation. The result is that power steering systems according to the invention are more sensitive.

Earlier hydraulic steering systems utilizing a direction control valve, and utilizing pressure sensors to actuate the motor of the powered, hydraulic pump, typically require full movement of the valve spool before the powered pump is actuated. This is because the pressure cannot build up and actuate the pump motor until the spool of the direction control valve has moved to its limit. Prior to this point, fluid outputted by the steering pump simply moves the valve spool and thus pressure does not build up. By comparison, the powered pump in a system according to the invention begins to operate as soon as a change in position of the valve spool is detected, thus significantly increasing steering sensitivity. Much less effort is needed to move the spool than to actuate the powered, hydraulic pump utilizing pressure sensors. Therefore much less effort is needed from a boat operator and the steering response is quicker.

The invention is also well adapted for retrofitting existing manual, hydraulic steering systems as found, for example, in many smaller pleasure craft. As explained in more detail below, the system can be derived by fitting a power assist steering apparatus, including such standard components as a powered hydraulic pump, a directional control valve and check valves, between the helm and the steering cylinder. Alternatively the invention can be utilized on new vessels or with new hydraulic steering installations on existing vessels.

BRIEF DESCRIPTION OF THE DRAWINGS

Referring to the drawings.

DETAILED DESCRIPTIONS OF THE PREFERRED EMBODIMENTS

Figure 1:
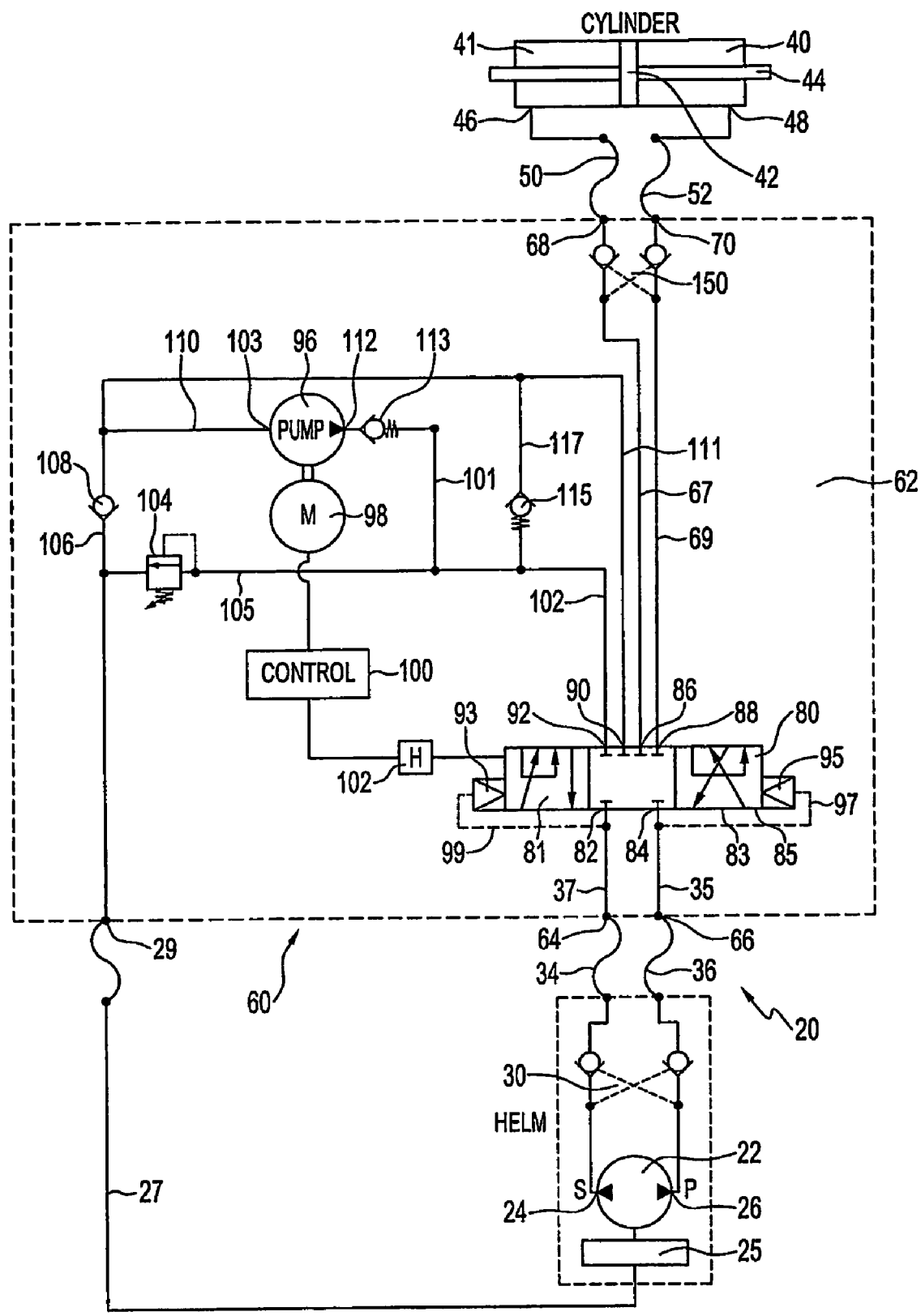
FIG. 1 is a schematic diagram of a hydraulic power assist steering system according to an embodiment of the invention.

Referring to FIG. 1, this shows a hydraulic power assist steering system 20 according to an embodiment of the invention. The system includes a manually operable, hydraulic steering pump 22. In this embodiment, intended for steering marine craft, the steering pump is a conventional rotary helm pump. A steering wheel, not shown, is connected to the steering pump and is rotated to steer the vessel. The steering pump has a first steering pump port 24 and a second steering pump port 26. Fluid is pumped out of the pump through port 24 to steer the vessel to starboard, while fluid is pumped out of port 26 to steer the vessel to port. The steering pump is equipped with a conventional lock valve 30 which prevents a back flow of fluid from moving the helm. A pair of hydraulic conduits 34 and 36 are hydraulically connected to the ports 24 and 26 of the steering pump. The pump is also connected to a reservoir 25.

There is a hydraulic steering actuator in the form of steering actuator or cylinder 40 provided with a barrel 41, a piston 42 and a piston rod 44. The steering cylinder is connected to a steering member for the vessel which may be a rudder, an outboard motor or an inboard/outboard motor, when the steering system is utilized for a marine vessel. Alternatively the actuator could be connected to wheels of a land vehicle. Also it should be understood that other types of actuators could be substituted including rotary hydraulic actuators. The steering cylinder has a first port 46 and a second port 48 which receive pressurized hydraulic fluid to move the piston in opposite directions for steering in opposite directions. A hydraulic conduit 50 is connected to port 46, while hydraulic conduit 52 is connected to port 48. In a manual steering system hydraulic conduit 34 would be connected directly to hydraulic conduit 50, while conduit 36 would be connected directly to conduit 52.

The system in this example however includes a hydraulic power assist steering apparatus shown generally at 60. The apparatus has a body 62 provided with a first port 64, a second port 66, a third port 68 and a fourth port 70. Port 64 and 66 are connected to the steering pump by conduits 34 and 36, while ports 68 and 70 are connected to the steering cylinder by means of conduits 50 and 52. The apparatus also has a reservoir port 29 connected to reservoir 25 by conduit 27. Thus it may be seen that the apparatus 60 can be connected to an existing manual, hydraulic steering system by interposing it between the steering cylinder and the steering pump. Alternatively, the entire hydraulic power assist steering system 20 could be new or sold as a unit.

Figure 2:
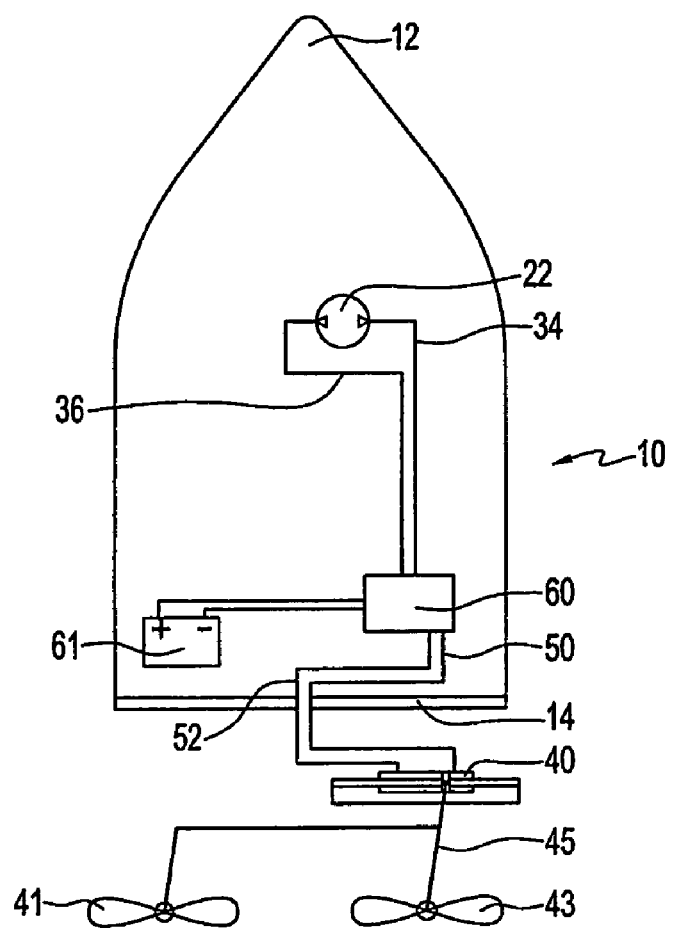
FIG. 2 is a schematic plan view of a marine craft fitted with a hydraulic power assist steering system according to an embodiment of the invention.

FIG. 2 shows the apparatus 60 installed in a boat 10 with a hull 11. The hull has a bow 12 and a transom 14. Also shown is the steering pump 22 and a battery 61 for providing power to the apparatus 60. The steering cylinder 40 is connected to a pair of outboard motors 41 and 43 by steering linkage 45. In alternative installations the apparatus can be used for inboard/outboard drives or rudders for example. The hydraulic lines 34 and 36 connect the apparatus 60 to the steering pump, while the hydraulic lines 50 and 52 connect the apparatus to the steering cylinder.

The apparatus 60 includes a 3-position, 6-way directional control valve 80, shown in FIG. 1, with a valve spool 81. The spool 81 comprises a member sealingly and reciprocatingly received within cylinder 83 of the valve in body 85 thereof. The valve has a series of valve ports 82, 84, 86, 88, 90 and 92. These ports are referred to in the claims as the first, second, third, fourth, fifth and sixth valve ports, but these terms can refer to any of the valve ports 82, 84, 86, 88, 90 and 92, the terms first, second, third, fourth, fifth and sixth merely being used to distinguish different valve ports referred to previously in the same claim or previous claims. The valve is hydraulically actuated by actuators 93 and 95 whereby the spool shifts to the right, from the point of view of FIG. 1, when hydraulic fluid flows into the apparatus through port 64 and shifts to the left, from the point of view of FIG. 1, when hydraulic fluid flows into the apparatus through port 66.

The apparatus includes a powered, hydraulic pump 96 with a motor 98, a DC, variable speed motor in this example. It may be seen that the pump 96 is located hydraulically between the manual steering pump 22 and the steering actuator 40. In this case the pump is in series with the manual steering pump and the steering actuator. The motor is controlled by a motor controller 100 coupled to a position sensor 102 adjacent to the valve 80. The position sensor senses the position of the valve spool 81 and provides a signal to controller 100 to power the motor 98 when the valve spool is shifted by hydraulic fluid entering the apparatus through either port 64 or port 66. Controller 100 in this example is a proportional controller which controls the motor speed in proportion to displacement of spool 81 and, accordingly, to the amount of steering via pump 22.

In this example the sensor is a linear variable differential transformer (LVDT). However other position sensors could be used, for example an anisotropic magnetoresistive (AMR) sensor. In one example a commercially available integrated circuit is used. The integrated circuit includes eight AMR strips arranged in two Wheatstone bridges. One bridge provides differential measurement and another bridge provides temperature compensation. A magnet is affixed to the spool of the spool valve. The integrated circuit provides a differential voltage based on the angle between the magnetic moment factor and current flow in resistor strips. Alternatively other types of sensors such as Hall effect sensors or giant magnetoresistive (GMR) sensors could be used, preferably with temperature compensation.

The port 90 of the directional control valve is connected to input port 103 of the powered, hydraulic pump by hydraulic conduits 111 and 110. Output port 112 of the powered hydraulic pump is connected to port 92 of the directional control valve via hydraulic conduits 101 and 102. A check valve 113 is provided on the conduit 101.

When the helm is steered to starboard, the manually operable steering pump 22 discharges hydraulic fluid through port 24. The fluid flows into the hydraulic power assist steering apparatus 60 via hydraulic conduit 34, port 64 and conduit 37. The flow of fluid displaces valve spool 81 to the right, from the point of view FIG. 1, thereby connecting port 82 to port 90 and consequently to hydraulic conduits 111 and 110 and input port 103 of the powered hydraulic pump 96. At the same time, port 92, and consequently output port 112 of powered hydraulic pump 96, are connected to port 86 and thereby to port 68 of the steering apparatus via conduit 67 and to port 46 of the hydraulic cylinder 40 via hydraulic conduit 50. Simultaneously, port 88 of the directional control valve is connected to port 84 which interconnects port 48 of the hydraulic cylinder 40 with port 26 of the manually operable, hydraulic steering pump 22, via conduits 52, 69 and 36.

Conduit 99 connects conduit 37 to actuator 93. When the fluid flows into the hydraulic steering apparatus 60 through port 64, and shifts the valve spool 81 to the right, the position as detected by sensor 102 provides a signal to controller 100. The controller 100 then provides power to the motor 98 to operate the powered hydraulic pump 96. In this example, voltage supplied to the motor is proportional to the amount of movement of valve spool 81. The fluid flows from the manually operable steering pump to the hydraulic steering actuator, and from the steering actuator to the steering pump, in the same manner as with a manual, hydraulic steering system, but receives a power assist from pump 96. It may be seen that the powered hydraulic pump 96 is actuated in response to a volume flow of fluid from the steering pump 92. The volume flow is detected by movement of the valve spool 81, which is proportional to the volume flow, and by the sensor 102.

When the steering pump is rotated in the opposite direction, and fluid flows out of port 26, it flows into port 66 of the hydraulic power assist steering apparatus 60 via hydraulic conduit 36 and to port 84 of the valve via conduit 35. This causes valve spool 81 to shift to the left, from the point of view of FIG. 1, thus aligning port 84 with port 90 so the hydraulic fluid flows towards the input port 103 of the powered, hydraulic pump. The output port 112 of the pump is connected to port 70 of the apparatus via conduits 101 and 102 and ports 92 and 88 of the directional control valve. The port 70 is connected to port 48 of the steering cylinder via conduit 52. The other port 46 of the steering cylinder is connected via conduit 50, port 68 and conduit 67 of the apparatus to port 86 of the directional control valve which the valve connects to port 82 of the valve and accordingly to port 24 of the manually operable, hydraulic steering pump 22 via port 64 and hydraulic conduit 34.

Conduit 97 connects conduit 35 to actuator 95. As before, the position sensor 102 detects the shift of the valve spool to the left caused by the flow of hydraulic fluid into the apparatus through port 66 and provides a signal to controller 100 to operate the motor 98 and powered, hydraulic pump 96. Thus the pump pumps hydraulic fluid received from port 26 of the manually operable, hydraulic steering pump towards port 48 of the steering cylinder. The operation is the reverse to that described above when the valve spool is shifted to the right. The operation of the powered pump 96 is controlled by the volume of fluid flowing from the steering pump 22. The movement of valve spool 81 is proportional to the volume of fluid flowing from the pump 22. This movement is sensed by sensor 102 which provides a signal to controller 100 to operate motor 98 of the powered pump 96. It should be understood that references to "right" and "left" herein are for purposes of understanding the invention only and do not necessarily indicate actual directions of movement of the valve spool in a working embodiment.

Check valve 108, located on conduit 106, is provided as a makeup check valve. When the powered pump 96 pumps faster than the manually operable pump 22 is supplying fluid, the powered pump sucks fluid from the reservoir through valve 108.

Relief valve 104, located on conduit 105, provides a relief back to reservoir in the event that the powered pump 96 makes excessive hydraulic pressure.

Check valve 113, on conduit 101, prevents fluid from entering output port 112 of the pump 96.

Check valve 115, on conduit 117, prevents pressurized fluid from the powered hydraulic pump from entering the input port 103 of the pump.

Lock valve 150 is provided to prevent feedback from the hydraulic cylinder 40 from affecting operation of the hydraulic power assist steering apparatus 60 or the manually operable hydraulic steering pump 26. This, like lock valve 30, is conventional and accordingly is not described in more detail.

Variations of the invention are possible. For example, pump 96 could be reversible and this would remove the need for the directional control valve. However the operation of the pump could still be controlled by a volume flow of fluid from the steering pump unlike prior art references where the operation of the pump is controlled by the pressure of fluid coming from the pump. Instead of pressure sensors, one or more hydraulic cylinder and piston combinations could be connected to the ports of the steering pump 22 and one or more position sensors, similar to sensor 102, could be used to detect movement of the pistons and accordingly the volume flow. The operation would be similar to the embodiment above except that the piston and cylinder combination would not have any function as a directional control valve.

In other embodiments two powered pumps could be used instead of one. Also, rotary devices could replace the spool valve and piston and cylinder combinations referenced above.

Figure 3:
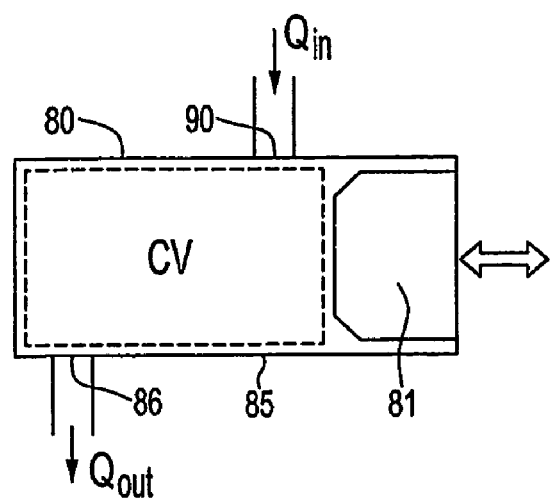
FIG. 3 is a fragmentary, diagrammatic view of a control valve for the embodiments of FIGS. 1 and 2, illustrating the relationship between a control volume of fluid in the valve and fluid flow into and out of the valve.

FIG. 3 shows a fragment of the control valve 80 including a fragment of the spool 81 and two of the ports 90 and 86. The position sensor senses the position of the spool 81 which is directly related to the control volume of fluid CV in the control valve. The position sensor senses changes in the control volume as defined in the following equation:

$$\Delta CV = \int (q_{in} - q_{out}) dt$$

where:
CV=Control Volume;
$q_{in}$=flow into the CV from the manually operable, hydraulic steering pump 22; and
$q_{out}$=flow out of the CV into the powered, hydraulic pump 96.

Figure 4:
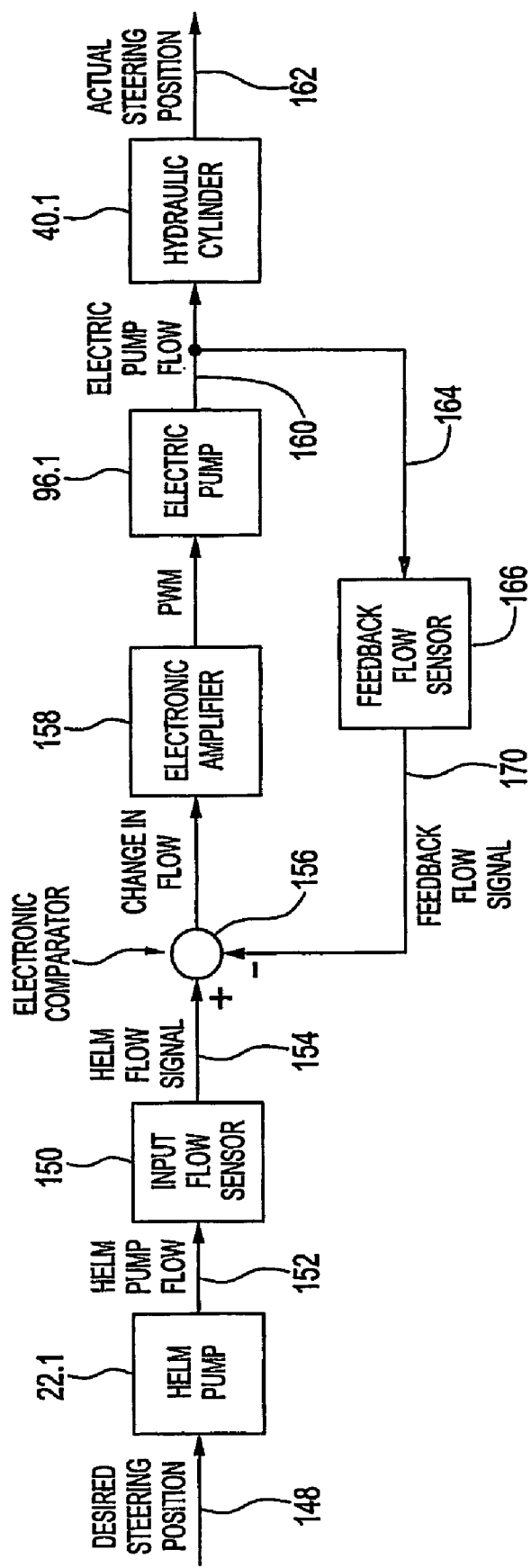
FIG. 4 is a schematic view of a hydraulic power assist steering system according to another embodiment of the invention.

In another embodiment, shown in FIG. 4, where like parts have like numbers as in FIG. 1 with the additional designation ".1", an input flow sensor 150 detects output 152 of hydraulic fluid from helm pump 22.1. Signal 154 from the flow sensor is fed to electronic comparator 156 which provides a signal to control the output of the powered pump 96.1 through electronic amplifier 158. Output 160 of hydraulic fluid from the pump is fed to cylinder 40.1 to adjust the steering position 162. There is a negative feedback loop 164 whereby feedback flow sensor 166 senses the hydraulic fluid output 160 of the electric pump and provides a negative feedback 170 to the comparator 156. Thus the output 160 of the electric pump is controlled in a manner commensurate with output 150 of the helm pump 22.1 and accordingly with the desired steering position 148.

Figure 5:
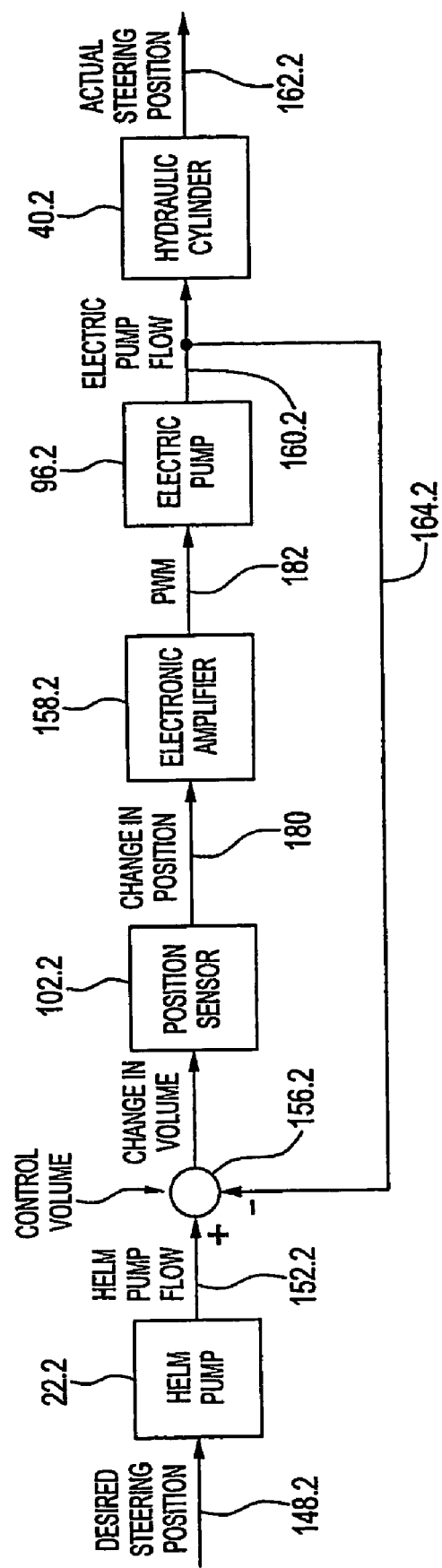
FIG. 5 is a schematic view of a fourth embodiment of the invention.

FIG. 5 shows an embodiment similar to that of FIG. 4 and like parts have like numbers with the additional designation ".2". In this example comparator 156.2 is a hydraulic comparator and may represent the function, for example, of valve 80 in the embodiment of FIG. 1. Here, hydraulic output 152.2 of helm pump 22.2 is fed into the comparator having the control volume CV identified in the equation above. Position sensor 102.2 is used to determine, for example, the position of the spool 81 for the embodiment of FIG. 3. The electrical output 180 of the sensor is fed to electronic amplifier 158.2 which provides a signal 182 to the powered pump 96.2. Output 160.2 of the pump is fed to hydraulic actuator 40.2 which actuates the steering position at 162.2. Negative feedback loop 164.2 represents an outflow of hydraulic fluid from the comparator 156.2 equal to hydraulic output 160.2 of the electric pump. Thus the change in the control volume, as determined by sensor 102.2, ensures that the hydraulic output 160.2 of the powered pump 96.2 is in accordance with the output 152.2 of helm pump 22.2 and accordingly of the desired steering position 148.2.

It will be understood by someone skilled in the art that many of the details provided above are by way of example only and can be varied or deleted without departing from the scope of the invention as set out in the following claims.

What is claimed is:

1. A power assist apparatus for a hydraulic steering system, comprising:
a directional control valve; a first valve port hydraulically connected to the control valve and being connectable to a first pump port of a manually operable steering pump; a second valve port hydraulically connected to the control valve and being connectable to a second pump port of the manually operable steering pump; a third valve port, a fourth valve port, a fifth valve port and a sixth valve port; a powered hydraulic pump having an input port and an output port, the input port and the output port being hydraulically connected to third and fourth ports of the control valve, respectively, the control valve having a member displaced in a first manner when hydraulic fluid flows into the apparatus through the first valve port, said member being displaced in a second manner when hydraulic fluid flows into the apparatus through the second valve port; a position sensor for detecting movement of the member; a controller for operating the powered hydraulic pump, said controller receiving signals from the sensor to operate the pump when hydraulic fluid flows into the apparatus through the first the valve port or the second valve port, the fifth and sixth valve ports being for hydraulic connection to a steering actuator, the control valve connecting the output port of the pump to the fifth valve port when hydraulic fluid flows into the apparatus through the first port and connecting the output port of the pump to the sixth valve port when hydraulic fluid flows into the apparatus through the second port.

2. The apparatus as claimed in claim 1, wherein the control valve is a spool valve and the member is a spool thereof.

3. The apparatus as claimed in claim 2, wherein the control valve is a 3 position, 6-way valve.

4. The apparatus as claimed in claim 1, wherein the pump has a variable speed motor, the controller being a proportional controller, whereby speed of the motor is proportional to displacement of the member of the control valve.

5. A power assist steering apparatus, comprising:
a powered hydraulic pump; a first port for receiving hydraulic fluid from a manually operable steering pump; means for detecting a flow of fluid into the apparatus through the first port; a controller for operating the powered hydraulic pump when said flow of fluid into the apparatus through the first port is detected; a second port for outputting fluid to a hydraulic steering actuator; and means for directing hydraulic fluid output from the powered hydraulic pump to the second port, and for directing fluid flowing into the apparatus to the powered hydraulic pump, when said flow of fluid into the apparatus through the first port is detected.

6. The apparatus as claimed in claim 5, wherein the means for detecting includes a member movable by fluid flowing into the apparatus through the first port and a position sensor adjacent thereto.

7. The apparatus as claimed in claim 6, wherein the means for directing including a control valve, the member being a spool of the control valve.

8. The apparatus as claimed in claim 7, including a third port connectable to the manually operable steering pump and a fourth port connectable to the hydraulic steering actuator, the control valve connecting the fourth port to the third port when said flow of fluid into the apparatus through the first port is detected, the control valve directing hydraulic fluid output from the powered hydraulic pump to the third port when a flow of fluid into the apparatus through the third port is detected, the first port being connected to the fourth port when said flow of fluid into the apparatus through the third port is detected, the controller operating the powered hydraulic pump when said flow of fluid into the apparatus through the third port is detected.

9. A hydraulic steering apparatus, comprising:
a manually operable, hydraulic steering pump having a first steering pump port and a second steering pump port;
a steering actuator having a first steering actuator port and a second steering actuator port;
a powered hydraulic pump having a motor, an input port and an output port;
a directional control valve having a movable valve spool, a first valve port hydraulically connected to the first steering pump port, a second valve port hydraulically connected to the second steering pump port, a third valve port hydraulically connected to the first steering actuator port, a fourth valve port hydraulically connected to the second steering actuator port, a fifth valve port hydraulically connected to the input port of the powered hydraulic pump and a sixth valve port hydraulically connected to the output port of the powered hydraulic pump, the valve being hydraulically actuated, whereby hydraulic fluid flowing into the first valve port displaces the valve spool to connect to the first valve port to the fifth valve port, to connect the sixth valve port to the third valve port and to connect the fourth valve port to the second valve port; and hydraulic fluid flowing into the second valve port displaces the valve spool to connect the second valve port to the fifth valve port, to connect the sixth valve port to the fourth valve port and to connect the first valve port to the third valve port; p1 a position sensor adjacent to the directional control valve for detecting position on the spool thereof; and
a motor controller operatively connected to the position sensor and to the motor for operating the motor, and thereby the powered hydraulic pump, when the spool of the direction control valve is displaced by hydraulic fluid flowing into the first valve port or the second valve port.

10. The apparatus as claimed in claim 9, wherein the controller is a proportional controller, whereby speed of the motor, and thereby speed of the powered hydraulic pump, is proportional to displacement of the spool of the directional control valve.

11. The apparatus as claimed in claim 9, wherein the powered hydraulic pump is connected hydraulically in series with the steering actuator and the manually operable, hydraulic steering pump.

12. The apparatus as claimed in claim 11, wherein the sensor includes a linear variable differential transformer.

13. The apparatus as claimed in claim 11, wherein the sensor is an anisotropic magnetoresistive sensor.

14. The apparatus as claimed in claim 11, wherein the sensor includes an integrated circuit with a plurality of anisotropic magnetoresistive sensors arranged in Wheatstone bridges.

15. The apparatus as claimed in claim 11, wherein the sensor is a Hall effect sensor.

16. The apparatus as claimed in claim 11, wherein the sensor is a giant magnetoresistive sensor.

17. A marine craft having a power assist steering system, comprising:
a hull having a bow and a stern
a manually operable, hydraulic steering pump mounted in the hull and having a first steering pump port and a second steering pump port;
a steering actuator adjacent to the stern having a first steering actuator port and a second steering actuator port;
a powered hydraulic pump mounted in the hull having a motor, an input port and an output port;
a directional control valve having a movable valve spool, a first valve port hydraulically connected to the first steering pump port, a second valve port hydraulically connected to the second steering pump port, a third valve port hydraulically connected to the first steering actuator port, a fourth valve port hydraulically connected to the second steering actuator port, a fifth valve port hydraulically connected to the input port of the powered hydraulic pump and a sixth valve port hydraulically connected to the output port of the powered hydraulic pump, the valve being hydraulically actuated, whereby hydraulic fluid flowing into the first valve port displaces the valve spool to connect to the first valve port to the fifth valve port, to connect the sixth valve port to the third valve port and to connect the fourth valve port to the second valve port; and hydraulic fluid flowing into the second valve port displaces the valve spool to connect the second valve port to the fifth valve port, to connect the sixth valve port to the fourth valve port and to connect the first valve port to the third valve port;
a position sensor adjacent to the directional control valve for detecting position on the spool thereof; and
a motor controller operatively connected to the position sensor and to the motor for operating the motor, and thereby the powered hydraulic pump, when the spool of the direction control valve is displaced by hydraulic fluid flowing into the first valve port or the second valve port.

18. The craft as claimed in claim 17, wherein the controller is a proportional controller, whereby speed of the motor, and thereby speed of the powered hydraulic pump, is proportional to displacement of the spool of the directional control valve.

19. The craft as claimed in claim 18, wherein the powered hydraulic pump is connected hydraulically in series with the steering actuator and the manually operable, hydraulic steering pump.

20. The craft as claimed in claim 19, wherein the position sensor includes a sensor.

21. The craft as claimed in claim 17, wherein the sensor includes a linear variable differential transformer.

22. The craft as claimed in claim 17, wherein the sensor is an anisotropic magnetoresistive sensor.

23. The craft as claimed in claim 17, wherein the sensor includes an integrated circuit with a plurality of anisotropic magnetoresistive sensors arranged in Wheatstone bridges.

24. The craft as claimed in claim 17, wherein the sensor is a Hall effect sensor.

25. The craft as claimed in claim 17, wherein the sensor is a giant magnetoresistive sensor.

26. A method for providing power assisted steering for a marine craft having a manually operable steering pump and a hydraulic steering actuator, the method comprising:
hydraulically connecting a powered hydraulic pump between the manually operable pump and the actuator, connecting to the manually operable pump and the powered hydraulic pump a control valve with a movable member, and placing adjacent to the control valve a sensor for sensing a position of the movable member, the member being displaced by hydraulic fluid entering the control valve, the sensor sensing said displacement of the member and operating the powered hydraulic pump to assist in pumping hydraulic fluid from the manually operable pump to the actuator.

27. A hydraulic steering apparatus, comprising:
a manually operable, hydraulic steering pump;
a hydraulic steering actuator;
hydraulic conduits hydraulically connecting the manually operable pump to the actuator, whereby manual operation of the manually operable pump moves the actuator;
a powered hydraulic pump hydraulically connected by the conduits between the manually operable pump and the actuator;
means for operating the powered hydraulic pump when the manually operable pump is operated to assist movement of the hydraulic steering actuator, said means being actuated by sensing a volume of fluid displaced by the manually operable pump, said means for operating including a hydraulic cylinder hydraulically connected to the manually operable steering pump and a member sealingly and reciprocatingly received within the cylinder, whereby said member moves when the hydraulic cylinder receives hydraulic fluid from the manually operable steering pump, a position sensor adjacent to said member which senses a position of said member, and a controller coupled to the powered pump, the sensor being operatively connected to the controller and said sensor providing a signal to the controller to operate the powered hydraulic pump when the position of the member changes; and
means for providing a negative feedback, equivalent to output of the powered hydraulic pump, to the means for operating for maintaining said output of the powered hydraulic pump commensurate with said volume of fluid displaced by the manually operable pump.

28. The apparatus as claimed in claim 27, wherein the position sensor senses a control volume of fluid in the cylinder representing a volume of fluid outputted by the steering pump less fluid outputted from the cylinder to the powered pump.

29. A hydraulic steering apparatus, comprising:
a manually operable, hydraulic steering pump;
a hydraulic steering actuator;
hydraulic conduits hydraulically connecting the manually operable pump to the actuator, whereby manual operation of the manually operable pump moves the actuator;
a powered hydraulic pump hydraulically connected by the conduits between the manually operable pump and the actuator;
means for operating the powered hydraulic pump when the manually operable pump is operated to assist movement of the hydraulic steering actuator, said means being actuated by sensing a volume of fluid displaced by the manually operable pump; and
an input flow sensor which senses output of the steering pump, a feedback flow sensor which senses output of the powered pump and a comparator which compares signals from the input flow sensor and the feedback flow sensor and provides a signal to the powered pump, whereby said output of the powered pump is regulated according to said output of the steering pump and accordingly of a desired steering position.

30. A method for providing power assisted steering for a marine craft having a manually operable steering pump and a hydraulic steering actuator, the method comprising:
hydraulically connecting a powered hydraulic pump between the manually operable pump and the actuator, connecting to the manually operable pump and the powered hydraulic pump a control valve with a movable member, and placing adjacent to the control valve a sensor for sensing a position of the movable member, the member being displaced by hydraulic fluid entering the control valve, the sensor sensing said displacement of the member and operating the powered hydraulic pump through a controller to assist in pumping hydraulic fluid from the manually operable pump to the actuator, the controller being a proportional controller and the powered hydraulic pump being operated at a speed proportional to movement of the manually operable pump and to movement of the movable member.

* * * * *

UNITED STATES PATENT AND TRADEMARK OFFICE
CERTIFICATE OF CORRECTION

| | | |
|---|---|---|
| PATENT NO. | : 7,318,386 B2 | Page 1 of 1 |
| APPLICATION NO. | : 10/507833 | |
| DATED | : January 15, 2008 | |
| INVENTOR(S) | : Brian James Dudra et al. | |

It is certified that error appears in the above-identified patent and that said Letters Patent is hereby corrected as shown below:

Column 9, line 29, delete "p1".

Signed and Sealed this

Thirteenth Day of May, 2008

JON W. DUDAS
*Director of the United States Patent and Trademark Office*